(12) United States Patent
Walter et al.

(10) Patent No.: US 8,479,230 B2
(45) Date of Patent: Jul. 2, 2013

(54) SYSTEM AND APPARATUS FOR MANAGING MEDIA CONTENT

(75) Inventors: Edward Walter, Boerne, TX (US); Larry B. Pearson, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 658 days.

(21) Appl. No.: 11/612,955

(22) Filed: Dec. 19, 2006

(65) Prior Publication Data

US 2008/0148331 A1    Jun. 19, 2008

(51) Int. Cl.
*H04N 5/445* (2011.01)

(52) U.S. Cl.
USPC ............. 725/43; 725/37; 725/39; 725/41

(58) Field of Classification Search
USPC .............................. 725/39, 41–43
See application file for complete search history.

(56) References Cited

U.S. PATENT DOCUMENTS

| | | | | |
|---|---|---|---|---|
| 6,130,726 | A * | 10/2000 | Darbee et al. | 348/734 |
| 6,305,016 | B1 * | 10/2001 | Marshall et al. | 725/41 |
| 2002/0010925 | A1 * | 1/2002 | Kikinis | 725/39 |
| 2002/0138851 | A1 * | 9/2002 | Lord et al. | 725/133 |
| 2003/0002638 | A1 | 1/2003 | Kaar | |
| 2004/0117831 | A1 * | 6/2004 | Ellis et al. | 725/53 |
| 2004/0130568 | A1 * | 7/2004 | Nagano et al. | 345/733 |
| 2005/0212687 | A1 * | 9/2005 | Nishikata | 340/825.72 |
| 2007/0074245 | A1 * | 3/2007 | Nyako et al. | 725/34 |
| 2007/0124792 | A1 * | 5/2007 | Bennett et al. | 725/133 |
| 2008/0046932 | A1 * | 2/2008 | Stallings et al. | 725/52 |

FOREIGN PATENT DOCUMENTS

| | | |
|---|---|---|
| EP | 1685693 | 8/2006 |
| JP | 2005328394 | 11/2005 |
| WO | 0044168 | 7/2000 |
| WO | 0167315 | 9/2001 |

* cited by examiner

*Primary Examiner* — Nicholas Corbo

(74) *Attorney, Agent, or Firm* — Guntin & Gust, PLC; Jay Anderson

(57) ABSTRACT

A system and apparatus for managing media content is disclosed. An apparatus that incorporates teachings of the present disclosure may include, for example, a terminal device can have a controller element that receives a media guide from a Set-Top Box (STB), and presents on a display unit of the terminal device the media guide without presentation of said media guide on a media device coupled to the STB. Additional embodiments are disclosed.

21 Claims, 6 Drawing Sheets

SYSTEM AND APPARATUS FOR MANAGING MEDIA CONTENT

FIELD OF THE DISCLOSURE

The present disclosure relates generally to media systems and more specifically to a system and apparatus for managing media content.

BACKGROUND

Most users typically navigate through media content such as a television program viewed on an analog or digital media device with a remote control that manages the media device directly or indirectly by way of a Set-Top Box (STB). Common remote controls provide a keypad with numeric features and functions for switching channels, viewing programming guides, and controlling overall functions of the media device (e.g., volume, color, contrast, etc.). Although managing media content in this fashion has proven effective over the years, it remains cumbersome under certain use cases.

A need therefore arises for a system and apparatus for managing media content.

DETAILED DESCRIPTION

Embodiments in accordance with the present disclosure provide a system and apparatus for managing media content.

In a first embodiment of the present disclosure, a computer-readable storage medium in a terminal device can have computer instructions for receiving a media guide from a Set-Top Box (STB), and presenting on a display unit of the terminal device the media guide without presentation of said media guide on a media device coupled to the STB.

In a second embodiment of the present disclosure, STB can have a controller element that transmits a media guide to a terminal device for presentation on a display unit of the terminal device without presentation of said media guide on a media device coupled to the STB.

In a third embodiment of the present disclosure, a media device can have a controller element that receives video programming from an STB without program interruption while the STB transmits a media guide to a terminal device for presentation on a display unit of the terminal device.

Figure 1:
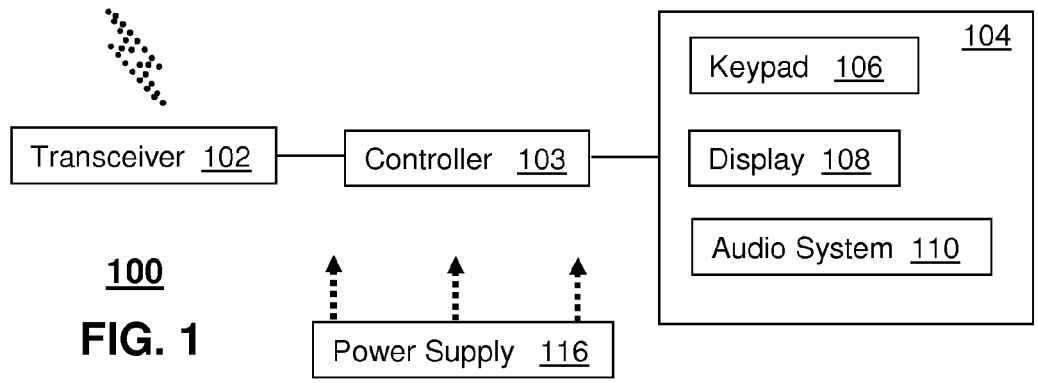
FIG. 1 depicts an exemplary embodiment of a terminal device.

FIG. 1 depicts an exemplary embodiment of a terminal device (TD) 100. The TD 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on.

Singly or in combination with the wireline technology, the transceiver 102 can support singly or in combination any number of wireless access technologies including without limitation infrared, Digital Enhanced Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the TD 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the TD 100. The UI element 104 can further include a display 108 such as monochrome or color LCD (Liquid Crystal Display) which can be touch sensitive for manipulating operations of the TD 100 and for conveying images to the end user of said device, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the TD 100 and to facilitate portable applications. Depending on the type of power supply 116 used, the TD 100 can represent an immobile or portable communication device. In this embodiment, power can be derived from a common AC outlet, a cable interface using Power over Ethernet, or other suitable power source means. The controller 103 can utilize computing technologies such as a microprocessor and/or digital signal processor (DSP) with associated storage memory such a Flash, ROM, RAM, SRAM, DRAM or other like technologies for controlling operations of the TD 100.

The TD 100 can further represent a single operational device or a family of devices configured in a master-slave arrangement. In the latter embodiment, the components of the TD 100 can be reused in different form factors for the master and slave TDs.

Figure 2:
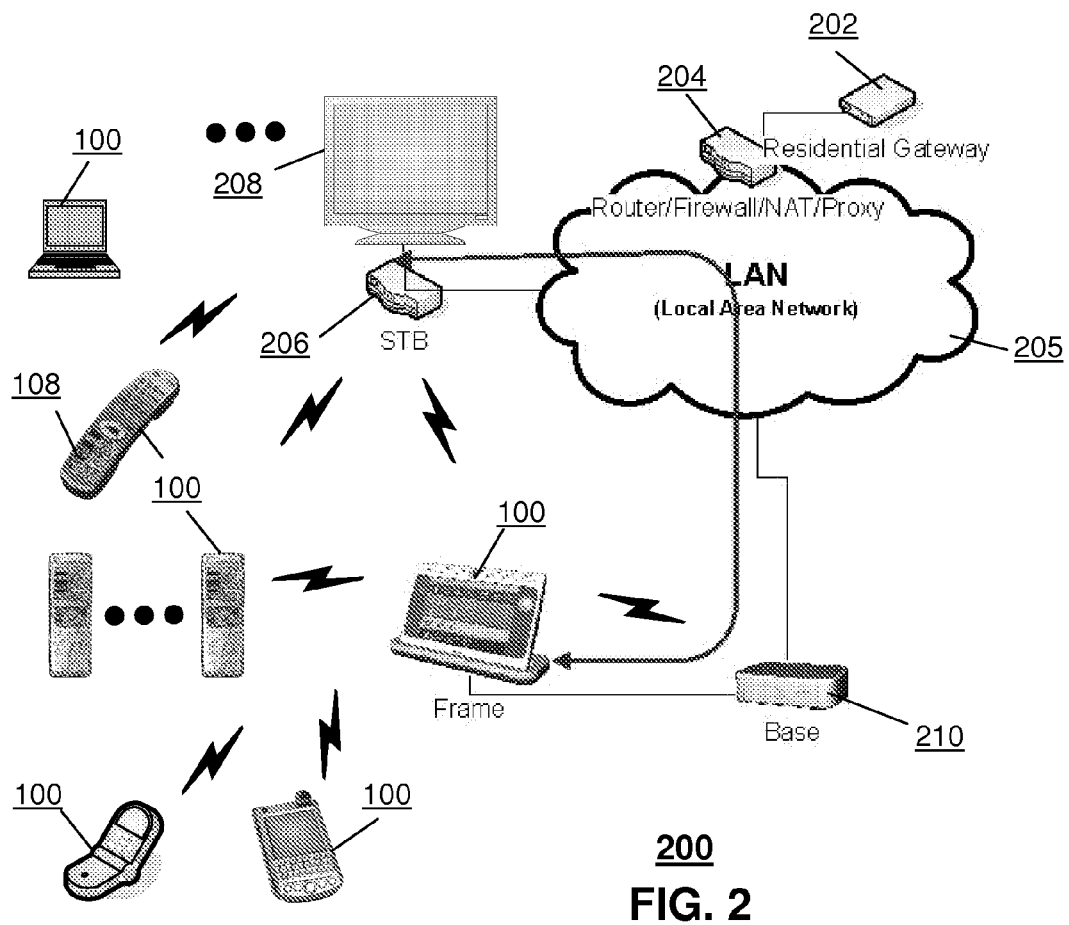
FIG. 2 depicts an exemplary embodiment of the terminal device operating in a media system.

FIG. 2 depicts an exemplary embodiment of the TD 100 operating in a media system 200. In this embodiment, the media system 200 can comprise a residential gateway (RG) 202 that provides access to a service provider's network services such as voice, video and/or data services. The RG 202 can be coupled to a router/firewall/proxy device 204 that performs the function of a secure wired and/or wireless local area network (LAN) 205 in a residential or commercial setting. The RG 204 can be coupled to one or more Set-Top Boxes (STBs) 206 and corresponding media devices 208 (such as an analog or digital television set) for viewing analog or digital (e.g., IPTV) media services. The RG 204 can also be coupled to a master-slave arrangement of TDs 100 (shown as a frame and slave handsets). The TDs 100 communicate by way of a base unit 210 coupled to the LAN 205 by common means. The TDs 100 in this representation can perform voice, video and data service functions with remote devices within the confines of the LAN 205. Alternatively, the TDs 100 can communicate directly with the STB 206. It would be apparent to one of ordinary skill in the art that any direct or indirect means for communicating with the STB 206 can be applied to the present disclosure.

As shown in FIG. 2, the TD 100 can have multiple embodiments including without limitation a cellular phone, a remote control, a cordless phone in the form of a handset or tablet (frame), a personal digital assistant, or a computing device such as a laptop or desktop computer (see FIG. 2). It would be apparent to one of ordinary skill in the art that the TD 100 of the present disclosure can embody any device having a display with a transceiver capable of communicating with the STB by wire or over-the-air using any present or future transmission medium. For convenience of presentation, and not to be considered limiting to the scope of the present disclosure, operations of the TD 100 will be described on the basis of the cordless phone embodiments shown in FIG. 2.

Figure 3:
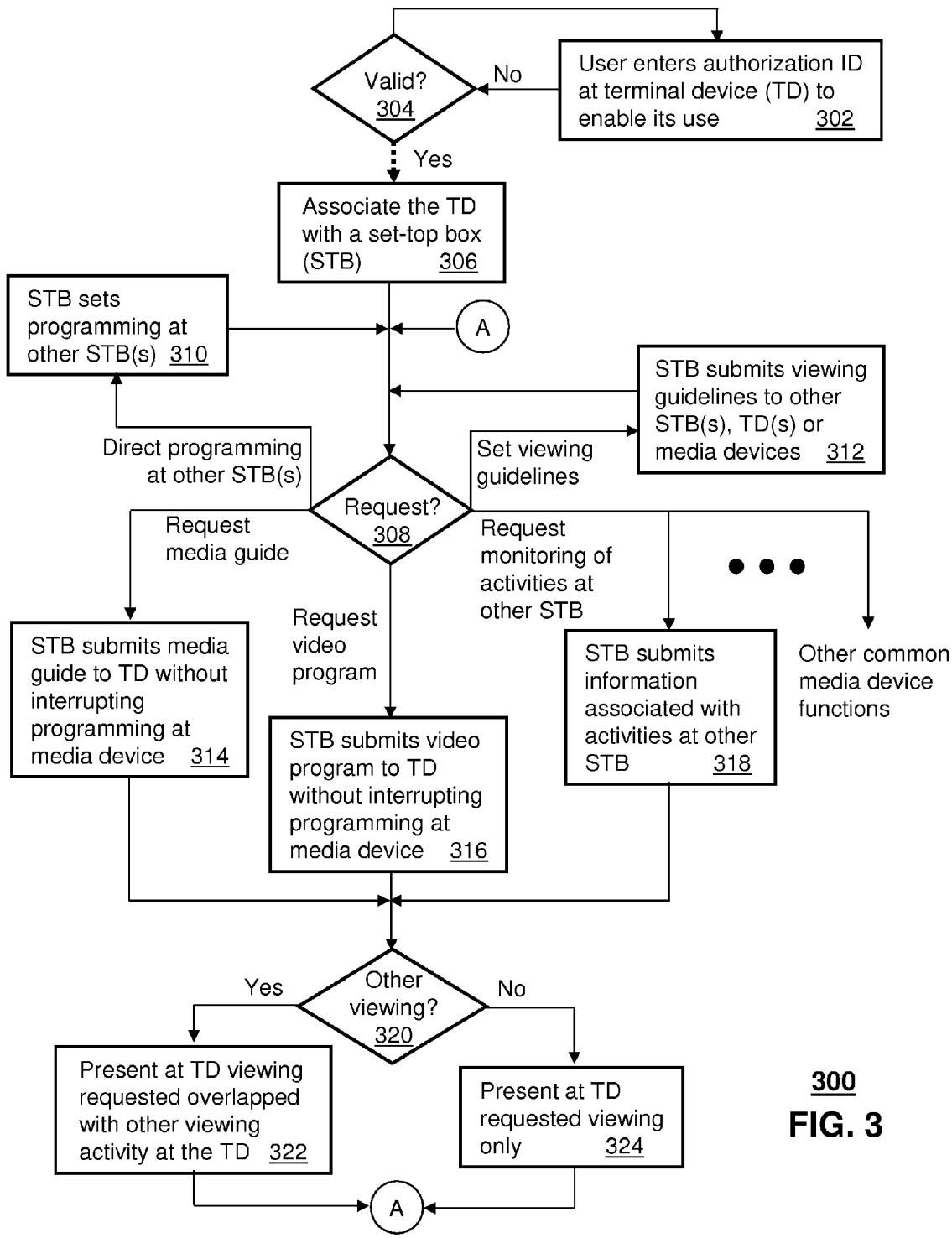
FIG. 3 depicts an exemplary method operating in the media system.

FIG. 3 depicts an exemplary embodiment of a method 300 operating in the media system 200. Method 300 begins with step 302 in which a user enters an authorization ID into a TD 200 to enable its use. This step can be used in cases where end users would like to restrict access to TDs on a per user basis. The authorization ID can be a user ID, a password, a personal identification number (PIN), a biometric ID (e.g., voice, fingerprint, retina, etc.) or other suitable form of identification. If the authorization ID received by the TD 100 is valid in step 304, then the TD proceeds to step 306 where it associates itself with the STB 206. If the entry is invalid, the TD 100 rejects the authorization ID and returns to step 302. The TD 100 can be further programmed to reject additional authorization attempts after several consecutive authorization failures. The TD 100 can, for example, reject further attempts for a period of time to reduce the possibility of an unauthorized user guessing the authorization ID. The TD 100 can also be programmed to submit a notice of possible tampering to its end user by way of, for example, an email, or over-the-air message.

In step 306, the TD 100 can be programmed to associate itself with the STB 206. This association can be reactive such as, for example, an end user of the TD 100 depressing a key function of the UI 104 that submits an access request to the STB 206 by way of the LAN 205 using wired or wireless means. Alternatively, the association can be proactive in which the TD 100 automatically submits an access request to the STB 206 when it detects the STB is accessible (by polling or other common detection techniques).

Once the TD 100 has made an association with the STB 206, it proceeds to step 308 where it awaits a request from the end user. From this step, the TD 100 can perform a number of functions such as direct programming at other STBs (step 310), set viewing guidelines at the STBs (step 312), request a media guide from a select STB (step 314), request a video program from the STB (step 316), request monitoring of activities at other STBs (step 318), and/or other common media device 208 operation functions (e.g., volume control, TV contrast, etc.). These requests can be invoked by a single keypad depression or a sequence of interactions with the UI 104 to achieve any one of the aforementioned requests. Additionally, the requested information can be submitted by the STB 206 to the TD 100 in the form of metadata or other suitable information that can be used to present said requests on the display 108 of the TD.

Figure 4:
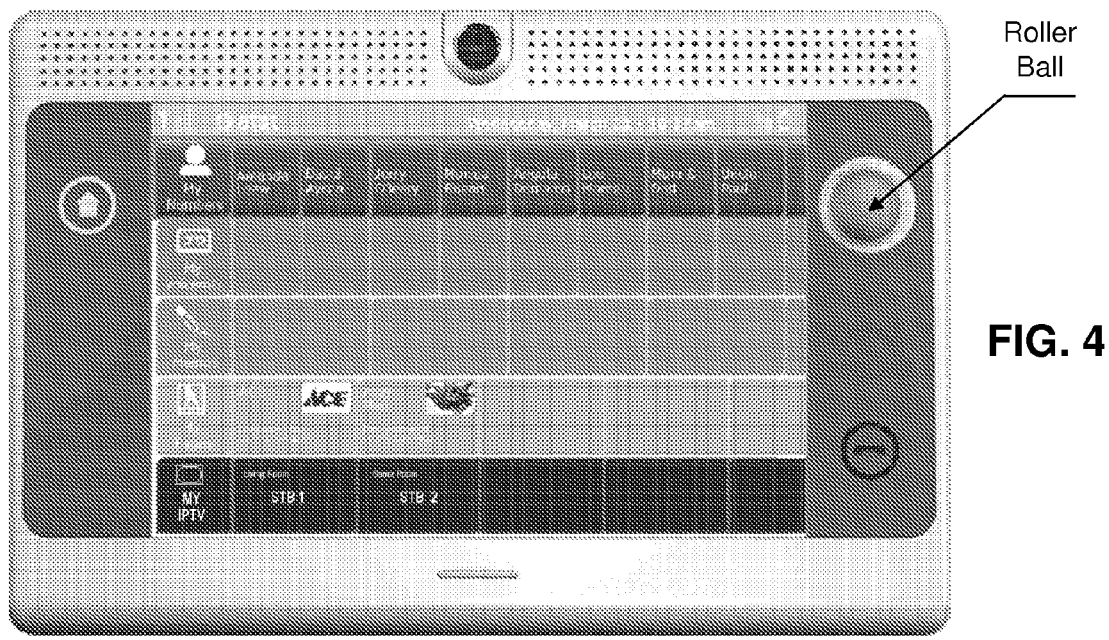
FIGS. 4-8 depict exemplary operational embodiments of the terminal device managing media content.

For example, as shown in the TD 100 of FIG. 4, a user can selectively communicate with STB 1 or STB 2 by touching one of these GUI elements on the screen or using the roller ball for said selection. Once an STB 206 is selected, the TD 100 can present on the display a graphical user interface (GUI) representing a menu with the aforementioned request options. Alternatively, selection of either STB GUI button can result in the presentation of another GUI in the form of a large remote control unit with said request options and common media device controls (volume, channel changer, imaging functions, etc.) being selectable by way of a touch screen or like selection method.

Step 310, can be useful in cases where an end user wants to direct video programming at multiple media devices 208 (such as in an entertainment setting, e.g., sports bar, or festivity in a residence). In this step, the end user can, for example, broadcast viewing of a particular channel on all STBs 206 rather than having to navigate between STBs. This step can be completed in potentially two steps: selecting a channel of interest, and selecting thereafter a broadcast button or function of the GUI remote control unit. Other selection techniques can be used. It should be noted that a broadcast channel request can be transmitted to the STBs 206 by an STB interacting with the TD 100 making such request or by way of a broadcast messages sent directly to the LAN 205.

Step 312 can be utilized for establishing viewing guidelines at the STBs 206, TDs 100, and/or media devices 208. This step can serve to establish, for example, parental controls or enterprise policies for the viewing of programming at a number of media devices 208 operating in a select LAN 205. The viewing guidelines can comprise establishing an allowable viewing period at each media device 208, rating restrictions (e.g., PG v. PG-13 or R) for viewing video programs, use restrictions at other TDs 100, or any other suitable use guideline applicable to the present disclosure. The viewing guidelines can be submitted to one STB 208 that coordinates such guidelines with other STBs, or the guidelines can be individually set at each STB by way of the LAN 205.

When requesting a media guide in step 314, the STB 206 interacting with the TD 100 making the request can be programmed to submit said guide to the requesting TD without interrupting program viewing at the media device 208 associated with the STB receiving the request. A media guide in this context can represent a media menu for controlling, for example, operations of the media device 208, and/or a media programming guide for navigating through video programs or other media content (e.g., still pictures). This step is helpful in that it avoids a viewing disruption of a video program being played at the media device 208 when there are multiple viewers or the requesting party wants to multitask without interrupting an on-going program.

Figure 5:
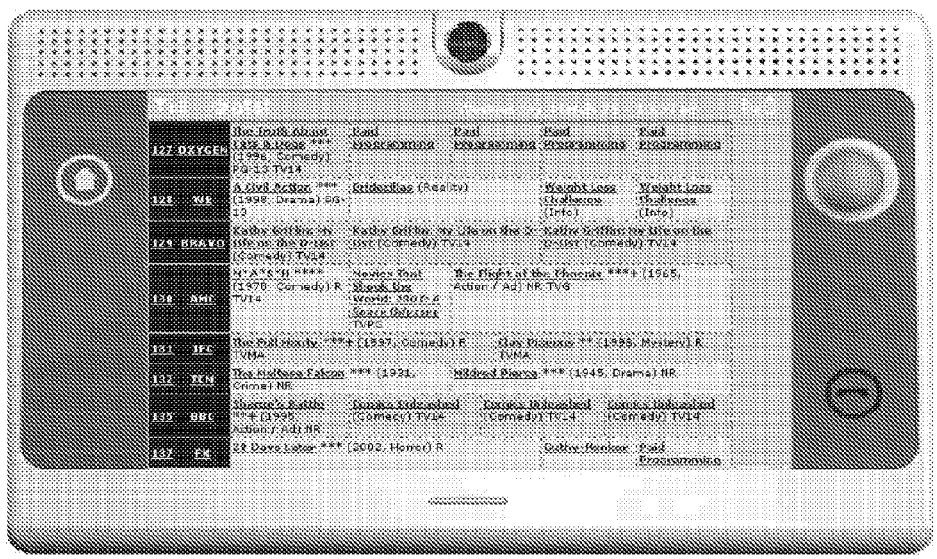
Figure 6:
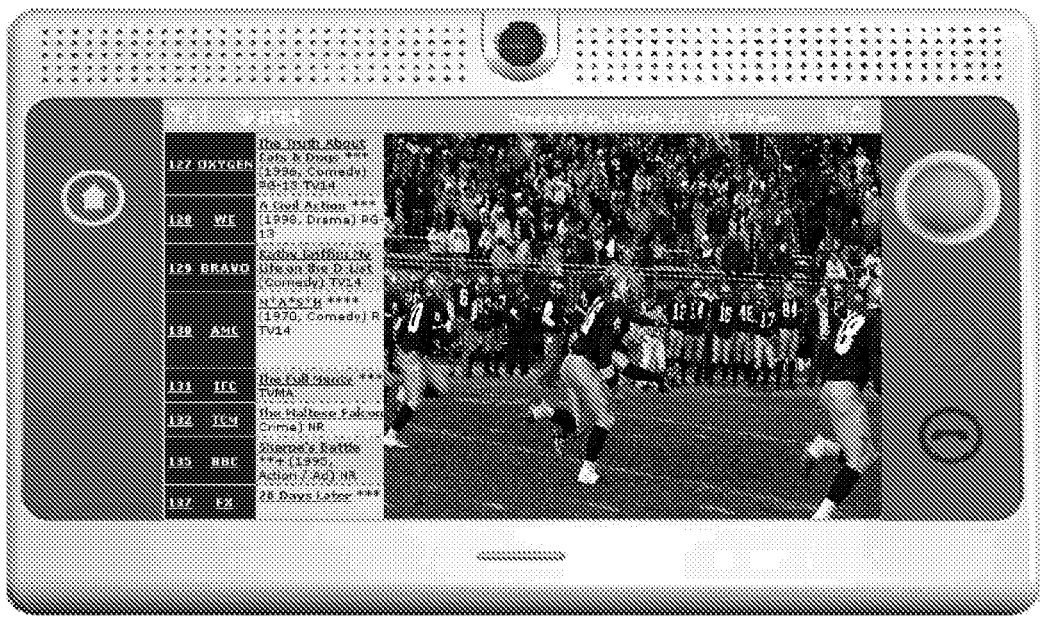
Figure 7:
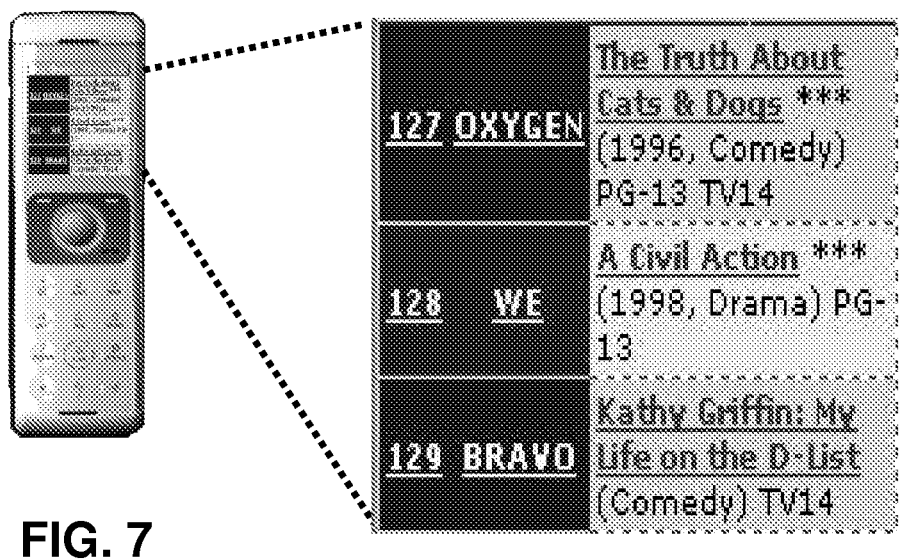
Figure 8:
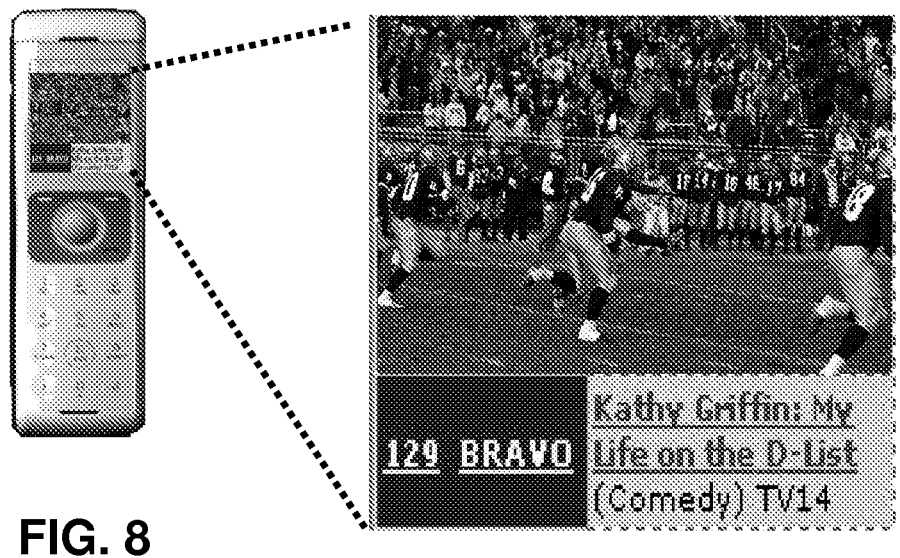

In step 320, the TD 100 can be programmed to determine if the media guide received in step 312 has arrived while viewing another activity (e.g., a video program). If it has, the media guide can be overlapped or superimposed in whole or in part with a previous viewing in step 322 (see FIGS. 6 and 8). Otherwise, the TD 100 presents said media guide exclusively in step 324 (see FIGS. 5 and 7).

Step 316 accounts for a use case when a video program has been requested. The video program selected can be a selection made by the end user from the media guide received in step 314. Like before steps 320-324 perform the task of determining whether superimposing of viewable activities are necessary.

Step 318 represents a use case where an end user of a TD 100 desires to monitor activities at other STBs 206. The activities monitored can be a live program being viewed at each of the STBs, or activity information that describes in text or otherwise what activities are being presented at the media devices 208 associated with the other STBs 206. Presentation of this monitored information can be managed by steps 320-324 as just described.

Although not shown, when multiple activities are being reviewed at the same time (e.g., step 322), a TD 100 represented by the embodiment of a frame (with a large display) can be programmed to establish a matrix or array of viewable screens so that simultaneous activities can be monitored. In this embodiment, each screen can be selectively navigated, or removed. When screen removal occurs, the TD 100 can be programmed to adjust the size of the remaining screens based on the new accommodated space. Similarly, when a new screen is added, the TD 100 can be programmed to adjust the size of all screens. Alternatively, or in combination, some screens can be given more priority in size (e.g., menus or program guides) to more effectively interpret and react to the activities being viewed. In yet another embodiment, when too many screens are being activated, some of the screens can be held in a background state. In this embodiment, the TD 100 can be programmed with a panning function which can bring into view hidden screens (similar to a virtual desktop that is larger than a given display size).

Upon reviewing the foregoing embodiments, it would be evident to an artisan with ordinary skill in the art that said embodiments can be modified, reduced, or enhanced without departing from the scope and spirit of the claims described below. There is for instance other viewable media content for which the present disclosure can be applied (streaming video, still pictures, Internet content, and so on. Similarly, method 300 can be modified (such as for example by removing steps 302-304) without affecting the scope of the claims described below. A media device 208 and STB 208 can be integrated to afford users more space and convenience. From these illustrations, it would be evident to said artisan that many modifications can be made to the present disclosure without departing from the scope of the claims stated below. Accordingly, the reader is directed to the claims section for a fuller understanding of the breadth and scope of the present disclosure.

Figure 9:
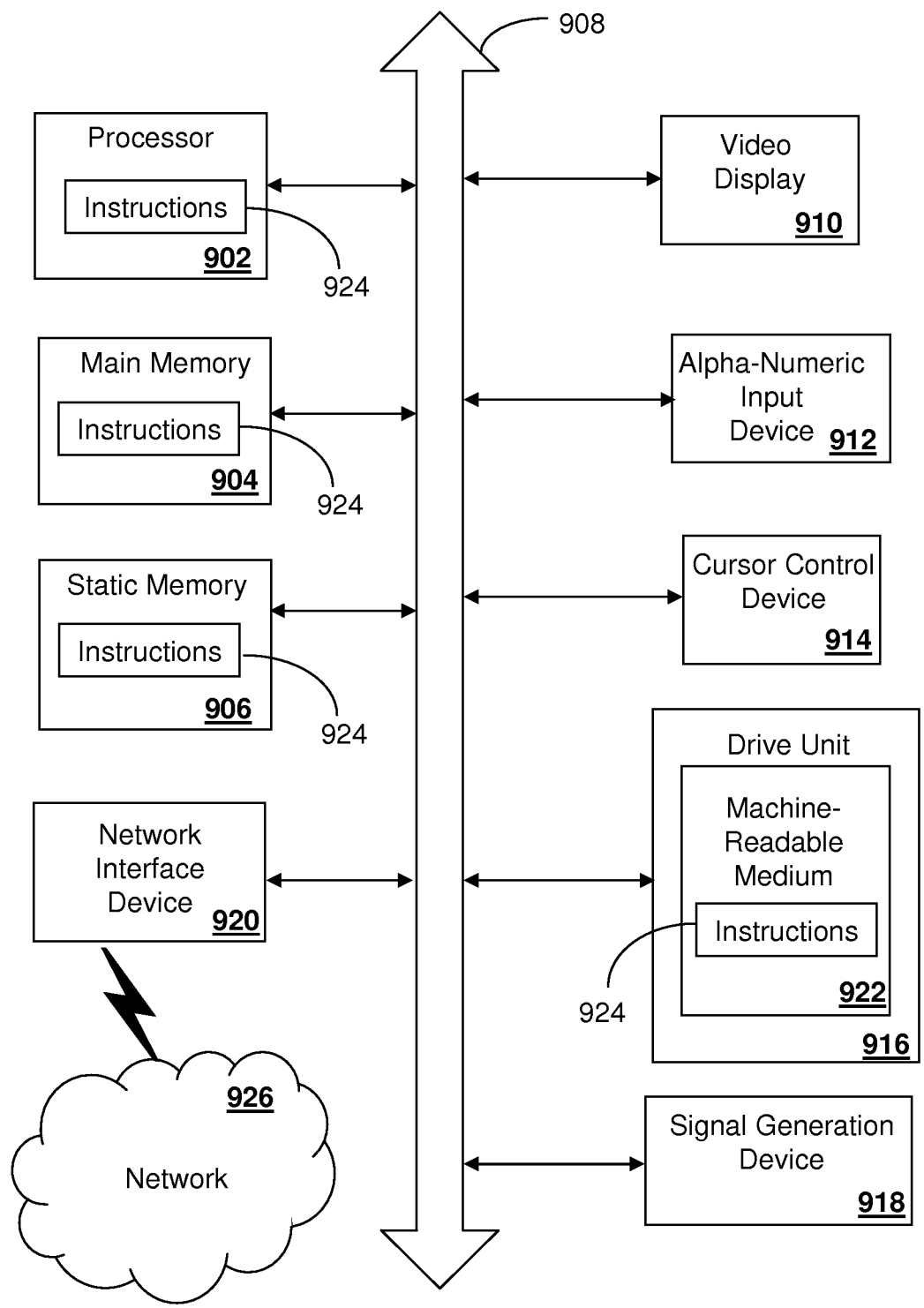
FIG. 9 depicts an exemplary diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which when executed by a processor cause the processor to perform operations comprising:

presenting a first graphical user interface at a display unit of a mobile terminal device, wherein the first graphical user interface comprises a first plurality of selectable elements corresponding to a plurality of set top boxes;

receiving a selection of a set top box based on user input at the first graphical user interface;

presenting a second graphical user interface at the display unit of the mobile terminal device, wherein the second graphical user interface comprises a second plurality of selectable elements corresponding to a plurality of request options for the selected set top box including a media guide;

submitting to the selected set top box a request to view the media guide during and without interrupting an on-going first video program presented at a media device associated with the selected set top box, wherein the request is based on user input at the second graphical user interface;

receiving the media guide from the selected set top box;

presenting a third graphical user interface at the display unit of the mobile terminal device, wherein the third graphical user interface comprises the media guide, the media guide including a programming guide;

receiving a program selection regarding a second video program from the programming guide of the media guide, wherein the program selection is based on user input at the third graphical user interface;

submitting to the selected set top box a request to view the selected second video program during and without interrupting the on-going first video program presented at the media device;

receiving from the selected set top box the second video program;

detecting the media guide being presented by the display unit;

adjusting a presentation area of the media guide on the display unit to generate an available presentation area for the second video program, wherein the presentation area for the media guide is determined according to a size priority assigned to the media guide; and presenting the second video program in the available presentation area of the display unit.

2. The non-transitory computer-readable storage medium of claim 1, wherein the media device comprises a television, and wherein the mobile terminal device and the display unit are in a master-slave relationship with each other.

3. The non-transitory computer-readable storage medium of claim 1, wherein the media guide comprises metadata that is configured for enabling the display unit to present the programming guide.

4. The non-transitory computer-readable storage medium of claim 1, wherein the operations further comprises:

selectively providing a request to the selected set top box from the mobile terminal device to monitor activities at another media device, based on user input at the second graphical user interface; and presenting a video program or program information associated with the activities monitored at the other media device.

5. The non-transitory computer-readable storage medium of claim 1, wherein the operations further comprises establishing viewing guidelines at another set top box.

6. The non-transitory computer-readable storage medium of claim 5, wherein the viewing guidelines comprise setting an allowable viewing period, a rating restriction for viewing video programs or use restrictions at other terminal devices.

7. The non-transitory computer-readable storage medium of claim 1, wherein the operations further comprises restricting access to the mobile terminal device.

8. The non-transitory computer-readable storage medium of claim 7, wherein the operations further comprise removing restricted access to the mobile terminal device upon receiving a user identification, a password, a personal identification number or a biometric identity.

9. The non-transitory computer-readable storage medium of claim 1, wherein the operations further comprise directing presentation of a media program at another set top box.

10. The non-transitory computer-readable storage medium of claim 1, wherein the media guide corresponds to an internet protocol television media menu and an internet protocol television media programming guide, wherein the media device comprises a television, and wherein the operations further comprise associating the mobile terminal device with the selected set top box, and wherein the media guide is generated by the selected set top box.

11. The non-transitory computer-readable storage medium of claim 1, wherein the mobile terminal device comprises a wireless communication device with short-range communication capability.

12. The non-transitory computer-readable storage medium of claim 1, wherein the mobile terminal device comprises a wireless voice communication device that utilizes code division multiple access, time division multiple access or a global system for mobile communications.

13. A method, comprising:
presenting, by a terminal device, a first graphical user interface at a display unit of the terminal device, wherein the first graphical user interface comprises a first plurality of selectable elements corresponding to a plurality of set top boxes;
receiving, by the terminal device, a selection of a set top box based on user input at the first graphical user interface;
presenting, by the terminal device, a second graphical user interface at the display unit of the terminal device, wherein the second graphical user interface comprises a second plurality of selectable elements corresponding to a plurality of request options for the selected set top box including a media guide;
submitting, by the terminal device, to the selected set top box a first request to view the media guide during and without interrupting an on-going first video program presented at a media device associated with the selected set top box, wherein the first request is based on user input at the second graphical user interface;
receiving, by the terminal device, the media guide from the selected set top box;
presenting, by the terminal device, a third graphical user interface at the display unit of the terminal device, wherein the third graphical user interface comprises the media guide;
submitting, by the terminal device, to the selected set top box a second request to view a second video program during and without interrupting the on-going first video program, wherein the second request is based on user input at the third graphical user interface;
detecting, by the terminal device, the media guide being presented by the display unit;
adjusting a presentation area of the media guide on the display unit to generate an available presentation area for the second video program, wherein the presentation area for the media guide is determined according to a size priority assigned to the media guide; and
presenting the second video program in the available presentation area of the display unit.

14. The method of claim 13, wherein the media guide is generated by the selected set top box.

15. The method of claim 13, further comprising receiving, by the terminal device, a video program selection from a programming guide of the media guide being presented by the display unit in the third graphical user interface.

16. The method of claim 13, further comprising transmitting, by the terminal device, a signal to the terminal device for monitoring activities at another media device.

17. The method of claim 13, further comprising directing the selected set-top box, by the terminal device, to establish viewing guidelines.

18. The method of claim 17, wherein the viewing guidelines comprise an allowed viewing period or a rating restriction for viewing video programs.

19. The method of claim 13, wherein the terminal device is a mobile cellular phone configured for providing voice communication with remote devices.

20. A terminal device, comprising:
a display unit;
a memory to store computer instructions; and
a controller element coupled to the memory and the display unit, wherein the controller element when executing the computer instructions performs operations comprising:
presenting a first graphical user interface at the display unit, wherein the first graphical user interface comprises a first plurality of selectable elements corresponding to a plurality of set top boxes;
receiving a selection of a set top box based on user input at the first graphical user interface;
presenting a second graphical user interface at the display unit, wherein the second graphical user interface comprises a second plurality of selectable elements corresponding to a plurality of request options for the selected set top box including a media guide;
submitting to the selected set top box a first request to view the media guide during and without interrupting an on-going first video program presented at a media device associated with the selected set top box, wherein the first request is based on user input at the second graphical user interface;
receiving the media guide from the selected set top box;
presenting a third graphical user interface at the display unit, wherein the third graphical user interface comprises the media guide;
submitting to the selected set top box a second request to view a second video program during and without interrupting the on-going first video program presented by the selected set-top box, wherein the second request is based on user input at the third graphical user interface;
receiving from the selected set top box the second video program;
detecting the media guide being presented by the display unit;
adjusting a presentation area of the media guide on the display unit to generate an available presentation area for the video program, wherein the presentation area for the media guide is determined according to a size priority assigned to the media guide; and
presenting the second video program in the available presentation area of the display unit.

21. The terminal device of claim 20, wherein the terminal device is a portable communication device.

* * * * *